United States Patent
Sonoda et al.

(10) Patent No.: US 7,146,368 B2
(45) Date of Patent: Dec. 5, 2006

(54) FILE SERVER AND FILE SERVER CONTROLLER

(75) Inventors: Koji Sonoda, Sagamihara (JP); Masaaki Iwasaki, Tachikawa (JP)

(73) Assignee: Hitachi, Ltd., Tokyo (JP)

( * ) Notice: Subject to any disclaimer, the term of this patent is extended or adjusted under 35 U.S.C. 154(b) by 316 days.

(21) Appl. No.: 10/785,950

(22) Filed: Feb. 26, 2004

(65) Prior Publication Data

US 2005/0102289 A1   May 12, 2005

(30) Foreign Application Priority Data

Nov. 7, 2003   (JP) .............................. 2003-377819

(51) Int. Cl.
G06F 7/00 (2006.01)
G06F 12/00 (2006.01)
G06F 17/30 (2006.01)

(52) U.S. Cl. .................. 707/10; 707/200; 707/204

(58) Field of Classification Search .................. 707/8, 707/10, 102, 200, 204; 709/220, 222, 236, 709/246, 226; 714/6, 4, 11, 43
See application file for complete search history.

(56) References Cited

U.S. PATENT DOCUMENTS

| | | | | |
|---|---|---|---|---|
| 5,831,913 | A * | 11/1998 | Kirihata ...................... | 365/200 |
| 6,148,414 | A * | 11/2000 | Brown et al. .................. | 714/9 |
| 6,438,100 | B1 * | 8/2002 | Halpern et al. .............. | 370/218 |
| 6,694,450 | B1 | 2/2004 | Kidder et al. | |
| 6,775,230 | B1 * | 8/2004 | Watanabe et al. ........... | 370/228 |
| 6,802,023 | B1 | 10/2004 | Oldfield et al. | |
| 6,961,868 | B1 * | 11/2005 | Tormasov et al. ............. | 714/6 |
| 2002/0083118 | A1 * | 6/2002 | Sim ........................... | 709/105 |
| 2002/0194427 | A1 | 12/2002 | Hashemi | |
| 2003/0002502 | A1 | 1/2003 | Gibson et al. | |
| 2004/0133743 | A1 | 7/2004 | Ito et al. | |
| 2004/0205381 | A1 | 10/2004 | Sakai | |

FOREIGN PATENT DOCUMENTS

JP   09-330182   12/1997

OTHER PUBLICATIONS

James V. Hansen (1983), Audit considerations in distributed processing systems, pp. 562-569.*
J. Richards, T. Kummell, D.G. Zarlengo (1988), A mass storage system for supercomputers based on unix, pp. 279-286.*
Sean Rhea et al, "Maintenance-Free Global Data Storage", IEEE Internet Computing, Sep.-Oct. 2001 Issue, pp. 40-49, USA.

* cited by examiner

Primary Examiner—Don Wong
Assistant Examiner—Merilyn Nguyen
(74) Attorney, Agent, or Firm—Mattingly, Stanger, Malur & Brundidge, P.C.

(57) ABSTRACT

The redundancy of a file is maintained without using a centralized controller in a system where file servers are connected via a network. Each domain ND within a file storage system includes a file server FS, a monitoring server WS, and a client CL, which are connected via a LAN. When the file server FS detects a failure in another file server FS in the system, it considers that redundancy of a file stored in the failed file server FS has decreased, and then determines whether or not it is responsible for recovering the redundancy. If the file server FS has determined that it is responsible for recovering the redundancy, it selects a file server FS as a file copy source and a file server FS as a file copy destination, and then copies the identical file from the copy source server to the copy destination server.

19 Claims, 14 Drawing Sheets

Fig.3

Configuration Table

| File Server | Consumed Disk Capacity | Remaining Disk Capacity | Network Distance | Domain | Status |
|---|---|---|---|---|---|
| FS1 | 100GB | 500GB | 10 | ND1 | Good |
| FS2 | 200GB | 600GB | 20 | ND1 | Good |
| : | : | : | : | : | : |
| FS4 | 100GB | 900GB | 20 | ND2 | Good |
| : | : | : | : | : | : |
| FS8 | 300GB | 400GB | 20 | ND4 | Bad |
| | | | | | |

Domain Table

| Domain | Monitoring Server |
|--------|-------------------|
| ND1 | WS1 |
| ND2 | WS2 |
| ND3 | WS3 |
| ND4 | WS4 |

Configuration Change Message

| File Server Name | Consumed Disk Capacity | Remaining Disk Capacity | Domain | Status |
|---|---|---|---|---|

FILE SERVER AND FILE SERVER CONTROLLER

BACKGROUND OF THE INVENTION

The present invention relates to a technique of improving the file maintainability by storing files of an identical content in a distributed manner into a plurality of file servers.

Conventionally, a system is well known that backs up data into disk drives of redundant configuration. For example, JP1997-330182A discloses a technique of maintaining the data redundancy when a failure has occurred in a disk drive among a disk drive group of redundant configuration, which is realized by backing up data from another disk drive storing data identical to data stored in the failed disk drive to a backup disk drive.

A non-patent document "Maintenance-Free Global Data Storage," INTERNET COMPUTING, U.S., IEEE COMPUTER SOCIETY, pp. 40–49, September-October, 2001 discloses a technique that relates to a file distribution/restore method referred to as M-of-N encoding in a system that stores files in a distributed manner into a plurality of file servers.

SUMMARY OF THE INVENTION

However, JP1997-330182A discloses that a predetermined controller controls the disk drive group. Accordingly, the controller performs the backup process and the other process when a failure has occurred in a disk drive. Therefore, there is a problem that the data redundancy can not be maintained if the controller itself has been failed.

The present invention was made in view of such problems, and thus one object of the present invention is to maintain the redundancy of file without using a centralized controller in the system where a plurality of file servers are connected with each other via a network, and another object is to balance usage statuses of storage devices provided for the respective file servers.

In order to solve at least part of the above problems, a file server of the present invention is configured as follows: a file server used in a system where identical files are stored according to predetermined redundancy in a distributed manner into a plurality of file servers connected with each other via a network, the file server including: a decreased redundancy detection unit for detecting a decrease in redundancy of file stored in the system; a determination unit for determining whether or not the file server has responsibility for recovering redundancy when the decreased redundancy detection unit has detected a decrease in redundancy of file; and a redundancy recovery processing unit for selecting a file server based on a predetermined condition the file server not storing an identical file to the redundancy-decreased file to set the selected file server as a copy destination server, setting one of file servers storing the identical file as a copy source server, and copying based on the settings the identical file from the copy source server to the copy destination server when the determination unit has determined the responsibility of the file server.

According to the present invention, the process for recovering the redundancy is performed after it is determined whether or not each file server connected with the network is responsible for recovering the file redundancy. Therefore, the system having such file servers can autonomously maintain the file redundancy.

It can be determined based on a variety of conditions as to the responsibility. For example, the responsibility may be determined if the redundancy-decreased file was originally created on the file server.

Alternatively, it is determined that the file server is not responsible for recovering the redundancy if the file server does not store the identical file. Accordingly, one of file servers storing the identical file is responsible for recovering the redundancy.

In another example, a priority order may be set for each file server within the system, and it may be determined that the file server is responsible for recovering the redundancy if the file server has the highest priority order. This ensures that a single file server is responsible for recovering the redundancy, and thereby reducing the traffic on the network.

In still another example, it may be determined that the file server is responsible for recovering the redundancy if the file server stores the identical file and has the highest priority order among file servers storing the identical file. This enables file servers that are responsible for recovering the redundancy to be distributed in the system depending on which file is stored in each file server, and thereby reducing the load concentration.

In the above file server, the decreased redundancy detection unit may consider redundancy of file to have decreased if it has detected a failure having occurred in another file server. The failure occurred in the file server may make it impossible to input or output a file normally. Therefore, even if the fact of the matter is that the file is normally stored in the failed file server, it is preferable that the redundancy of the file is determined to have decreased. This enables the file redundancy to be maintained irrespective of the cause of the failure.

The file server may further include a location storage unit for storing a relationship between each file stored in the system and a file server storing the file, wherein the determination unit searches the location storage unit and then determines that the file server is responsible for recovering the redundancy if it has been determined that the file server stores a file identical to a file stored in the failed file server. This enables a file stored in the failed server to be stored into another file server.

Furthermore, the location storage unit may record a priority order set for each of file servers storing an identical file, wherein the determination unit searches the location storage unit and then determines that the file server is responsible for recovering the redundancy if it has been determined that the file server stores a file identical to a file stored in the failed file server and has the highest priority order among file servers storing a file identical to a file stored in the failed file server. Accordingly, it can be determined based on the priority order set for each file whether or not the file server is responsible for recovering the redundancy of file having stored in the failed server.

In addition, in the file server including the above location storage unit, the redundancy recovery processing unit may search the location storage unit for a file server storing a file identical to a file stored in the failed file server and then set one of the searched file servers as the copy source server in order to recover the redundancy.

The file server of the present invention may further include a usage status detection unit for detecting a usage status of a storage device provided for another file server, wherein the redundancy recovery processing unit sets a file server having the highest remaining capacity of the storage device or a file server having the lowest consumed capacity of the storage device as the copy destination server. This ensures the efficient use of a storage device provided for each file server.

In another example, the file server of the present invention may further include a domain detection unit for detecting a network domain to which another file server belongs, wherein the redundancy recovery processing unit selects the copy source server and the copy destination server so that a network domain to which the copy source server belongs is different from a network domain to which the copy destination server belongs. This enables files to be efficiently located in a distributed manner, and thereby improving the failure tolerance of the system.

In still another example of the file server of the present invention, the redundancy recovery processing unit sets a file server storing the identical file and having the shortest network distance from the copy destination server as the copy source server.

The network distance may be expressed in a physical distance between network devices or a number of routers (i.e. a number of hops) that intervene between network devices. In the latter case, few routers intervening between file servers result in shorter network distance while more routers result in longer distance. According to the above configuration, the file is copied between file servers that are nearest to each other on network distance, and thereby reducing the entire network traffic.

The present invention may be configured as follows: a file server controller for balancing usage statuses among storage devices, the file server controller being used in a system where files are stored in a distributed manner into a plurality of file servers connected with each other via a network, the storage devices being provided for the respective file servers, the file server controller comprising: a usage status detection unit for detecting usage statuses of storage devices provided for the respective file servers; and a file migration control unit for selecting a file server as a file migration source and a file server as a file migration destination according to usage statuses of storage devices provided for the respective file servers and then migrating a file from the file migration source server to the file migration destination server based on the selection.

The file server controller enables usage statuses to be balanced among storage devices of the respective file servers. The usage status of storage device, for example, denotes a remaining capacity or a consumed capacity of storage area provided in the storage device. The storage device, for example, may include a disk device and a tape drive.

The above file server controller may further include a target value determination unit for calculating a target value of usage statuses of storage devices provided for the respective file servers according to usage statuses of storage devices provided for the respective file servers detected by said usage status detection unit, wherein the file migration control unit migrates a file so that a usage status of a storage device provided for the file migration source server becomes equal to the target value.

The target value, for example, may include an average remaining capacity of storage devices provided for the respective file servers, and an average consumed capacity. The file migration control unit need not achieve the target value with absolute accuracy, and preferably migrates a file so as to achieve the target value approximately within a predetermined range. The reason is that the file sizes are not necessarily fixed.

The various aspects of the present invention described above may be combined or partly omitted according to need.

Furthermore, the present invention may be configured as a redundancy recovery method of recovering file redundancy, a usage status balancing method of balancing usage statuses among storage devices provided for the respective file servers, a computer program for recovering file redundancy, a computer program for balancing usage statuses among storage devices provided for the respective file servers, and the like. Such computer programs may be recorded on a computer readable recording medium. The recording medium, for example, may include a variety of media such as flexible disk, CD-ROM, DVD-ROM, magneto-optics disk, memory card, and hard disk.

BRIEF DESCRIPTION OF THE DRAWINGS

FIG. 3 is a schematic that shows an exemplary configuration table;

FIG. 4 is a schematic that shows an exemplary domain table;

FIG. 5 is a schematic that shows a structure of a configuration change message;

DESCRIPTION OF THE PREFERRED EMBODIMENTS

Embodiments of the present invention are described with reference to the drawings in the following sequence.

A. General Structure of File Storage System
B. General Structure of Monitoring Server
C. General Structure of File Server
D. Processes
   (D-1) File Creation Process in File Server
   (D-2) File Server Monitoring Process in Monitoring Server
   (D-3) Configuration Table Update Process in Monitoring Server
   (D-4) Configuration Table Update Process in File Server
   (D-5) Redundancy Recovery Process in File Server
   (D-6) Responsibility Determination Process in File Server
   (D-7) Disk Balancing Process in Monitoring Server
   (D-8) File Migration Process in File Server
E. Modifications

A. General Structure of File Storage System

Figure 1:
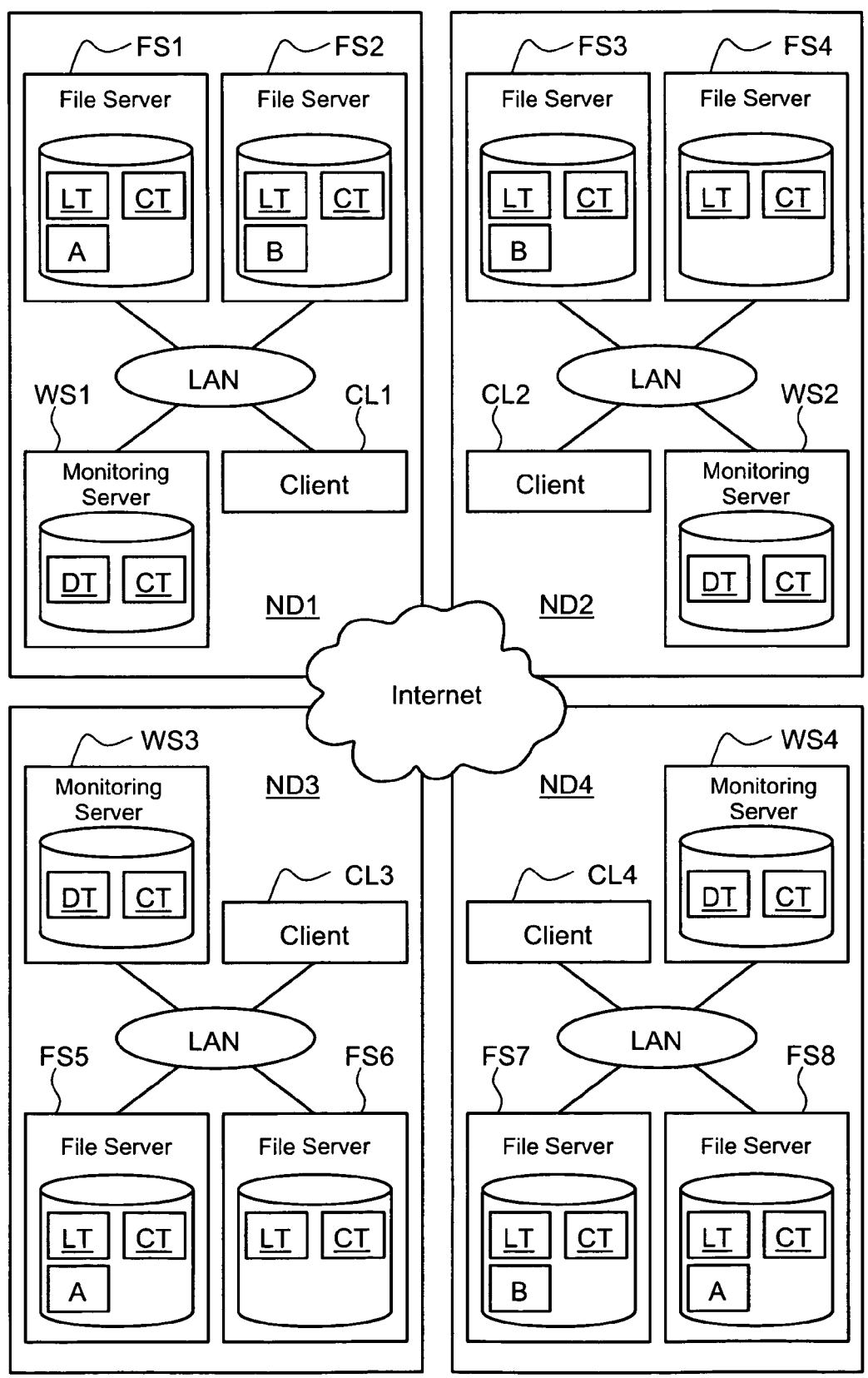
FIG. 1 is a schematic that shows a general structure of a file storage system as one embodiment.

FIG. 1 is a schematic that shows a general structure of a file storage system as one embodiment. The file storage system 10 includes a plurality of network domains ND (hereinafter referred to as "domain ND") that are connected with each other via Internet. Each of the domains ND includes a file server FS, a monitoring server WS, and a client CL, which are connected with each other via a LAN.

Although each of the domains ND includes two file servers FS and one client CL in this embodiment, it may include any number of such devices, which may be different among the domains ND. As shown in FIG. 1, the file storage system 10 includes a plurality of domains NS, file servers FS, monitoring servers WS, and clients CL, and therefore serial numbers are given to each of such devices for sake of distinction.

The monitoring server WS monitors configuration information of the file servers FS included in the same domain ND as the monitoring server WS. The configuration information include information on a remaining disk capacity and a consumed disk capacity of the file server FS, and a domain ND to which the file server FS belongs. The configuration information are recorded in a configuration table CT retained by the monitoring server WS. Updated information of the configuration table CT are distributed to all of file servers FS and monitoring servers WS included in the file storage system 10 via the LAN and Internet. The monitoring server WS retains a domain table DT that records information on which monitoring server WS belongs to each domain ND.

The file server FS is provided with a disk device, and the client CL mounts a file storage area provided in this disk device via the LAN to input or output a file. The disk device stores the configuration table CT and a location table LT that records locations of all files within the file storage system 10 as well as the file created by the client.

The file server FS periodically distributes its location table LT to all other file servers FS. Accordingly, all of the file servers FS included in the file storage system 10 can know locations of all files stored in the file storage system 10.

When the client CL creates a file, the file server FS creates a replica of the file on another file server FS according to a predetermined redundancy. In this embodiment, the predetermined redundancy is equal to 3. For example, when the client CL1 shown in FIG. 1 creates a file "A" on the file server FS1, the file server FS1 selects two other file servers FS according to a predetermined condition to create the replica on those file servers FS. FIG. 1 illustrates that the replica was created on the file server FS5 belonging to the domain ND3 and on the file server FS8 belonging to the domain ND4.

In this manner, the file server FS stores the files of an identical content in a distributed manner into a plurality of file servers FS according to the predetermined redundancy, and thereby improving the file maintainability. In order to maintain the file redundancy, the file server FS according to this embodiment has a function of recovering the redundancy if a failure of another file server FS has resulted in the decreased redundancy.

B. General Structure of Monitoring Server

Figure 2:
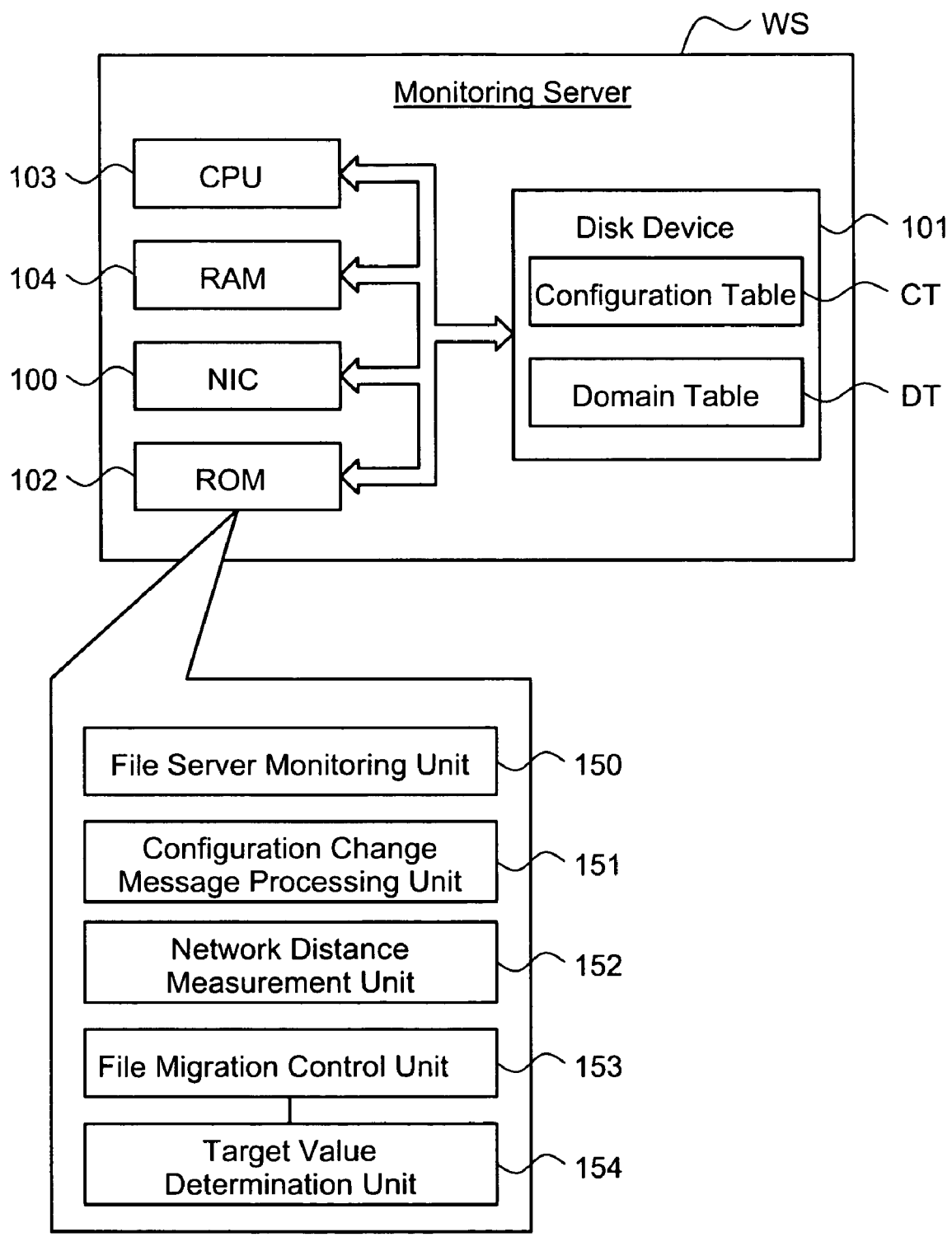
FIG. 2 is a schematic that shows a general structure of a monitoring server.

FIG. 2 is a schematic that shows a general structure of the monitoring server WS. The monitoring server WS is configured as a computer that includes a network interface controller (NIC) 100, a disk device 101, a ROM 102, a CPU 103, and RAM 104. The NIC 100 controls communications with another device via the LAN and Internet. The disk device 101 stores the configuration table CT and the domain table DT. These tables will be described later in detail.

The ROM 102 stores a control program to control the monitoring server WS. The CPU 103 uses the RAM 104 as a work area to perform the control program. The control program may be installed on the disk device 101.

The lower part of FIG. 2 shows functional blocks implemented as software by the above control program. A file server monitoring unit 150 monitors the configuration information of the file servers FS included in the same domain ND as the monitoring server WS, and records the monitoring result on the configuration table CT.

When the configuration information of the file server FS are changed, a configuration change message processing unit 151 sends a configuration change message, which indicates that the configuration information has been changed, to the monitoring servers WS included in the other domains ND.

Furthermore, when the configuration change message processing unit 151 receives the configuration change message from the monitoring server WS included in another domain ND, it updates the configuration table CT according to the received configuration change message. In addition, when the configuration change message processing unit 151 receives a configuration change message from the monitoring server WS included in another domain ND, it distributes this configuration change message to each file server FS included in the same domain ND. The file server FS updates its configuration table CT based on the configuration change message.

A network distance measurement unit 152 measures a network distance from the monitoring server WS to a new file server FS when the new network server FS is added to the file storage system 10. For example, the network distance may be expressed in a number of routers (i.e. a number of hops) that intervene between network devices. That is, the network distance becomes longer as intervening routers increase. In this case, the number of intervening routers, for example, can be measured by issuing a command such as "Tracert" or "Traceroute" to the file server FS subject to the measurement. Alternatively, the network distance may be expressed in arrival time of signal traveling on the network. In this case, the arrival time of signal, for example, can be measured by issuing a command "Ping" to the file server FS subject to the measurement.

A file migration control unit 153 balances remaining disk capacities of the file servers FS included in the same domain ND. A target value determination unit 154 calculates a remaining disk capacity of the file servers FS that is targeted by the file migration control unit 153 during the balancing of remaining disk capacities.

FIG. 3 is a schematic that shows an exemplary configuration table CT stored in the disk device 101. The configuration table CT records a consumed disk capacity, a remaining disk capacity, a network distance, a domain, and a status of each file server FS. A status field records a parameter "Bad" when there is a failure in the file server, and otherwise records a parameter "Good."

FIG. 4 is a schematic that shows an exemplary domain table DT stored in the disk device 101. The domain table DT records information on which monitoring server WS belongs to each domain ND.

FIG. 5 is a schematic that shows a structure of the configuration change message that is sent or received by the configuration change message processing unit 151. As shown in FIG. 5, the configuration change message records a name, a consumed disk capacity, a remaining disk capacity, a domain, and a status of the file server whose configuration information has been changed. The configuration change message sent from the monitoring server WS to the file servers FS further includes network distance information.

C. General Structure of File Server

Figure 6:
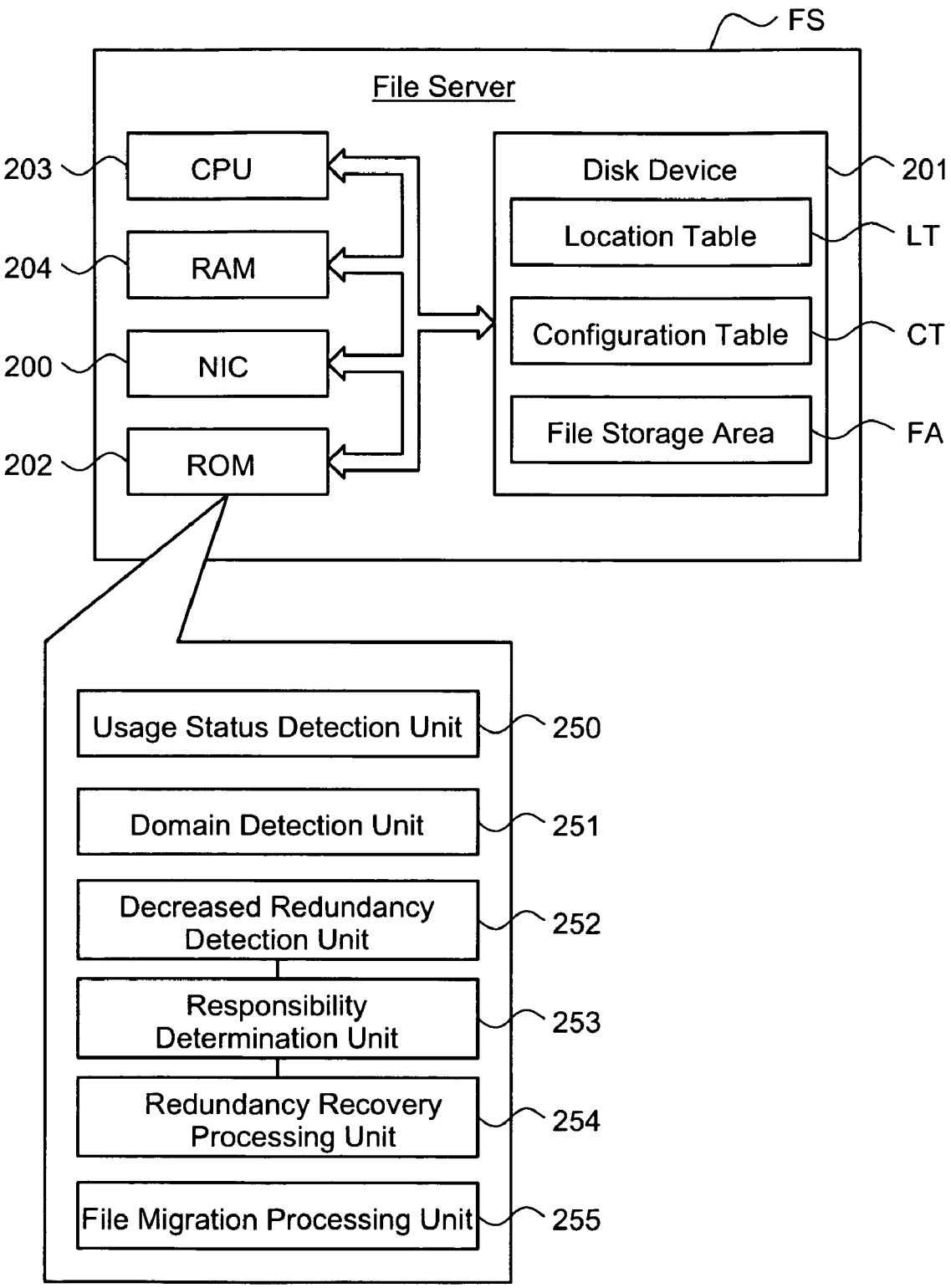
FIG. 6 is a schematic that shows a general structure of a file server.

FIG. 6 is a schematic that shows a general structure of the file server FS. The file server FS is configured as a computer that includes a NIC 200, a disk device 201, a ROM 202, a CPU 203, and RAM 204. The NIC 200 controls communications with another device via the LAN and Internet. The disk device 201 records the location table LT and the configuration table CT, and also provides the file storage area FA to store files.

The ROM 202 stores a control program to control the file server FS. The CPU 203 uses the RAM 204 as a work area to perform the control program. The control program may be installed on the disk device 201.

The lower part of FIG. 6 shows functional blocks implemented as software by the above control program. A usage status detection unit 250 refers to the configuration table CT to detect a remaining disk capacity and a consumed disk capacity of another file server FS. A domain detection unit 251 refers to the configuration table CT to detect a domain ND to which another file server FS belongs.

A decreased redundancy detection unit 252 refers to the configuration table CT, and then determines that the file redundancy has decreased if there is a file server FS whose status field has changed to "Bad." A responsibility determination unit 253 determines whether or not the file server FS is responsible for recovering the decreased redundancy.

A redundancy recovery processing unit 254 recovers the redundancy of the redundancy-decreased file if the file server FS is determined by the responsibility determination unit 253 to be responsible for recovering the redundancy. The redundancy is recovered by copying the redundancy-decreased file from one of the file servers FS storing such file to another file server FS.

A file migration processing unit 255 migrates a file to another file server FS according to an instruction of the monitoring sever WS to balance remaining disk capacities of the file servers FS included in the same domain ND.

Figure 7:
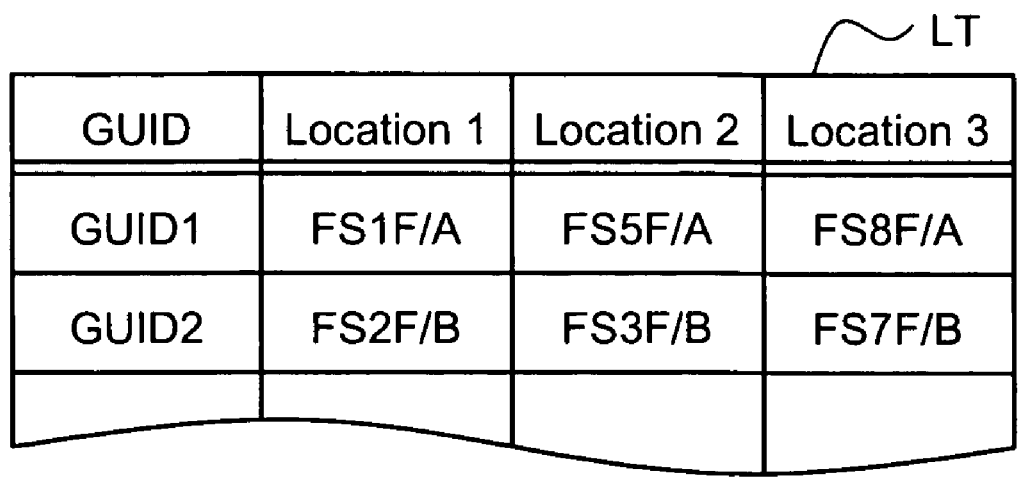
FIG. 7 is a schematic that shows an exemplary location table.

FIG. 7 is a schematic that shows an exemplary location table LT stored in the disk device 201. The location table LT records locations of all files stored in the file storage system 10. As shown in FIG. 7, the location table LT includes a field for recording identification information (GUID) uniquely given to each file, and fields (locations 1 through 3) for recording file locations. The file server FS recorded in "location 1" is an original server that originally created the file. In this embodiment, since the redundancy is equal to 3, the identical file is stored in two file servers FS indicated in "location 2" and "location 3" as well as in the original server.

The field for indicating a file location records a combination of a name of file server FS and a path of file stored in the file server FS. Information before ":" shown in FIG. 7 indicate a name of file server FS while information after ":" indicate a path of file stored in the file server FS. For example, the file GUID1 shown in FIG. 7 is stored with the file name "A" in root directories ("/") of the file servers FS1, FS5, and FS8. Although the file redundancy is equal to 3 without exception in this embodiment, it may be different among the files.

D. Processes (D-1) File Creation Process in File Server

Figure 8:
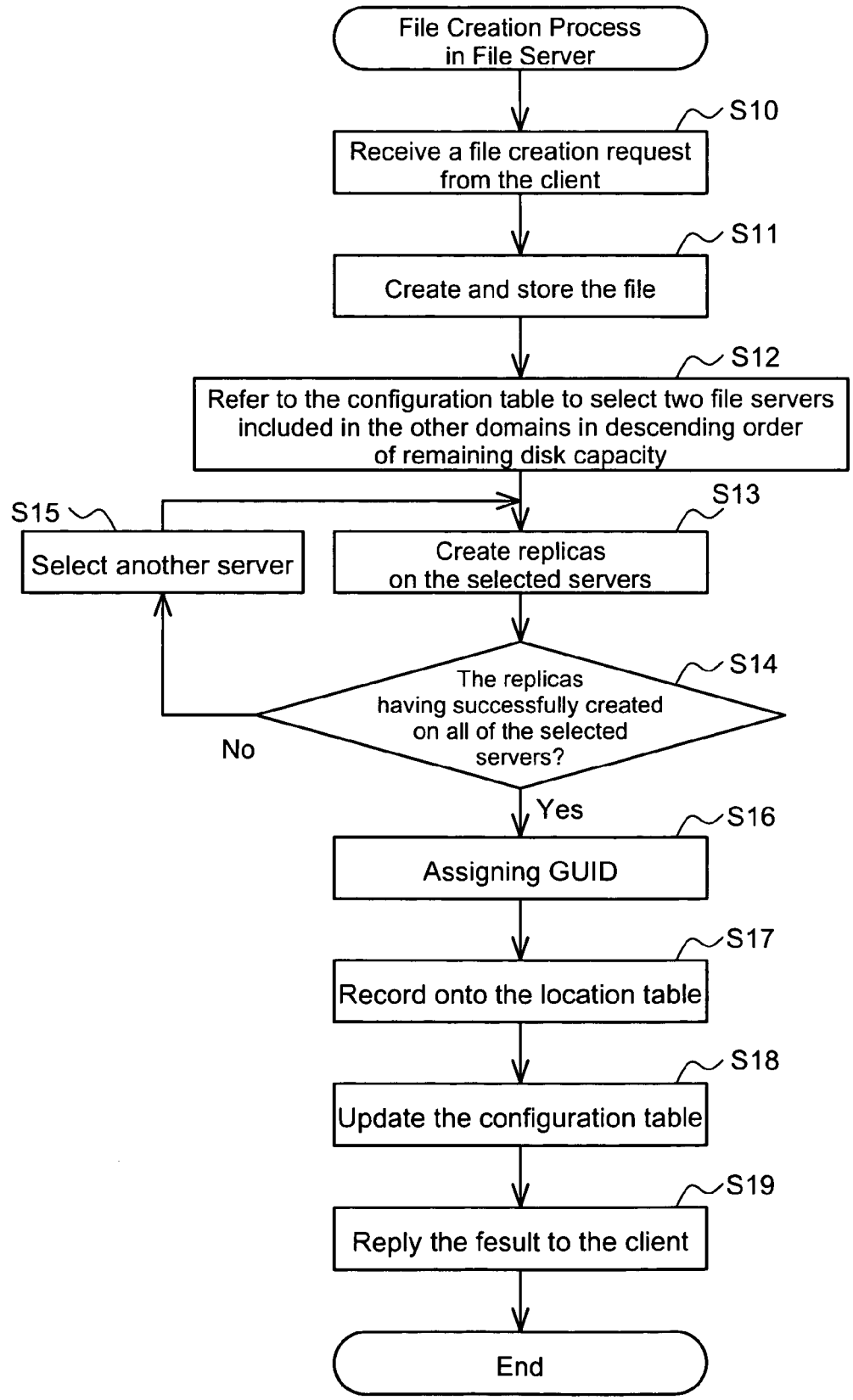
FIG. 8 is a flowchart that shows a file creation process.

FIG. 8 is a flowchart that shows a file creation process performed by the CPU 203 of each file server FS. This process creates a file in response to a request of the client CL.

First, when the CPU 203 receives a file creation request from the client CL (step S10), it creates a file in response to the request, and then stores the created file into the disk device 201 (step S11). Then, the CPU 203 refers to the configuration table CT to select two file servers FS among the file servers FS included in the other domains ND in descending order of remaining disk capacity. These two file servers preferably belong to different domains ND. The CPU 203, however, selects two file servers FS in increasing order of consumed disk capacity instead of remaining disk capacity.

Next, the CPU 203 creates a replica of the file created at step S11 on the two selected file servers FS (step S13). If the CPU 203 has failed to create the replica (i.e. No at step S14), it selects another file server FS again (step S15). If the CPU 203 has successfully created the replica on all of the selected file servers FS (i.e. Yes at step S14), it assigns a GUID to each of the files (step S16). The GUID is generated by combining an identification number of the domain ND and a unique number within the domain ND. Therefore, the GUID is defined as a unique identification number within the file storage system 10.

Next, the CPU 203 records the locations of the created files in associated with the respective GUIDs onto the location table LT (step S17). Furthermore, the CPU 203 updates the configuration table CT since the consumed disk capacity and the like are changed due to the file creation (step S18). Finally, the CPU 203 informs the client CL having sent the file creation request that the file creation is completed (step S19).

The file creation process described above enables the file server FS to distribute and store the files having an identical content into a plurality of file servers FS. This improves the file maintainability.

(D-2) File Server Monitoring Process in Monitoring Server

Figure 9:
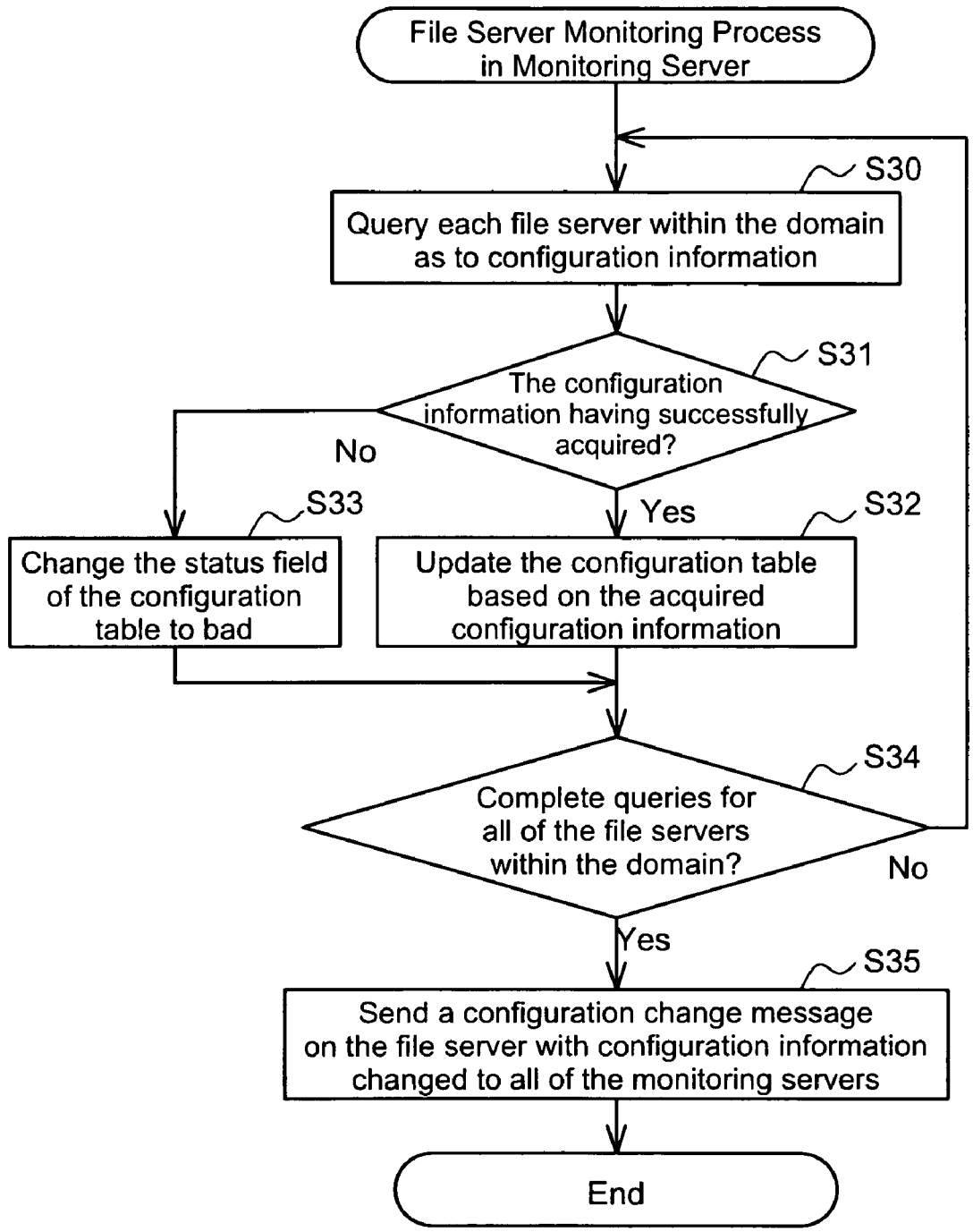
FIG. 9 is a flowchart that shows a file server monitoring process.

FIG. 9 is a flowchart that shows a file server monitoring process performed by the CPU 103 of each monitoring server WS. This process is performed by the monitoring server WS to monitor configuration information of the file servers FS included in the same domain.

First, the CPU 103 periodically queries each of the file servers FS included in the same domain ND as to the configuration information (step S30). If the CPU 103 has successfully acquired the configuration information (i.e. Yes at step S31), it updates the configuration table CT based on the acquired configuration information (step S32). If the configuration information have not been changed, the update is unnecessary.

If the CPU 103 has failed to acquire the configuration information (i.e. No at step S31), it is deemed to have detected a failure having occurred in the queried file server FS. Accordingly, the CPU 103 changes the status field of the configuration table CT of such file server FS to "Bad." Hereinafter, the file server FS in which a failure has occurred is referred to as "failed server."

When the CPU 103 has queried all of the file servers FS within the domain ND (i.e. Yes at step S34), it sends the configuration change message regarding the file server FS whose configuration information have been changed to all of the monitoring servers WS within the file storage system 10 (step S35).

At step S35, the CPU 103, for example, may send the configuration change message only if the consumed disk capacity or the remaining disk capacity has changed by not less than certain amount (e.g. 1 Gbytes). This is intended to minimize the increase in network traffic. However, the CPU 103 may send the configuration change message irrespective of variation of consumed disk capacity and the like if it has detected a failed server.

(D-3) Configuration Table Update Process in Monitoring Server

Figure 10:
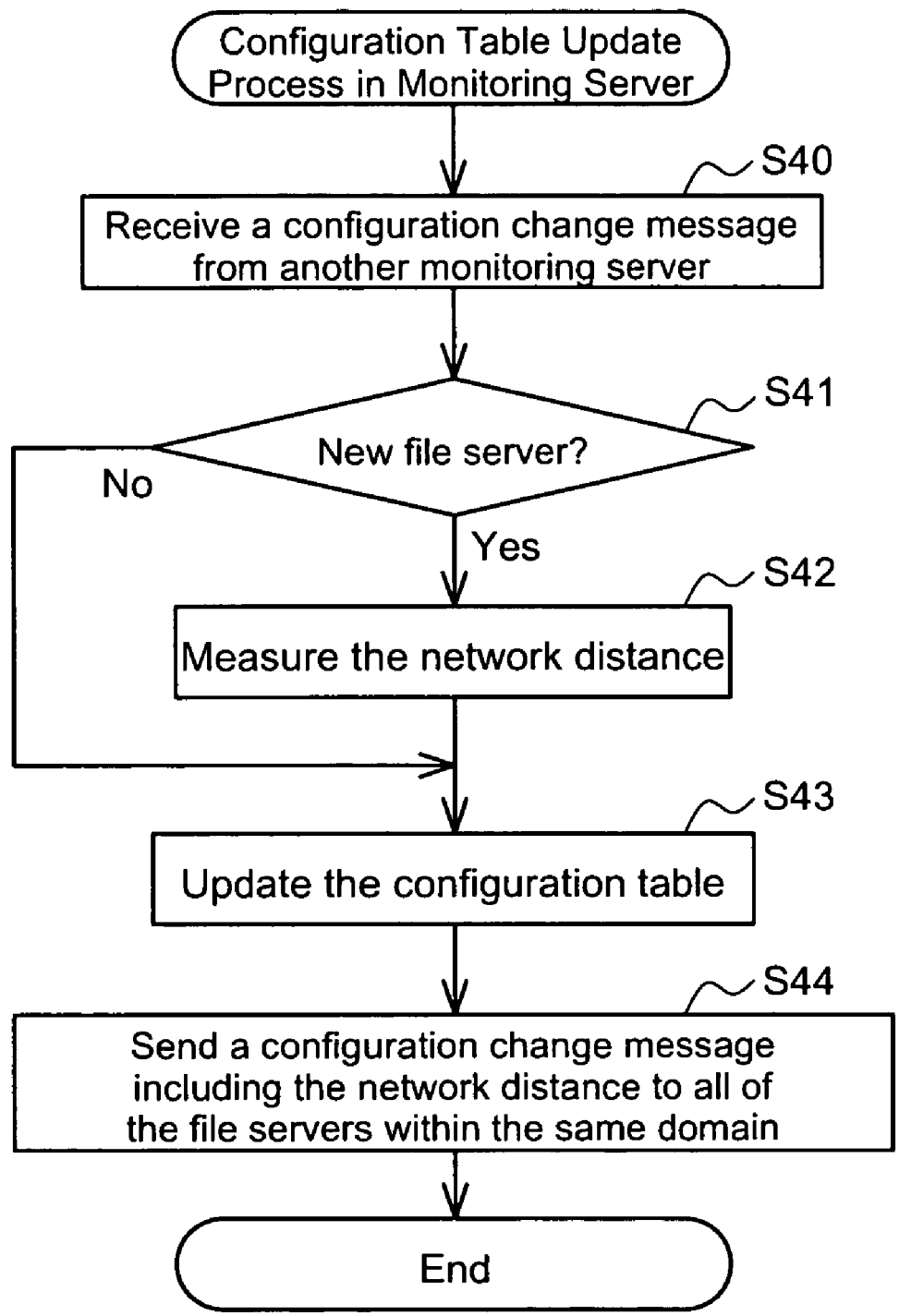
FIG. 10 is a flowchart that shows a configuration table update process performed by the monitoring server.

FIG. 10 is a flowchart that shows a configuration table update process performed by the CPU 103 of the monitoring server WS. The process is performed by the monitoring server WS to update its configuration table CT when it has received a configuration change message from another monitoring server WS.

First, when the CPU 103 receives the configuration change message from another monitoring server WS (step S40), it determines whether or not the configuration change message is related to a new file server FS that has not yet been registered in the configuration table CT retained on the disk device 101 (step S41).

If the configuration change message is related to the new file server FS (i.e. Yes at step S41), the CPU 103 measures a network distance from the monitoring server WS to the new file server FS (step S42). Then, the CPU 103 updates the configuration table CT based on the configuration change message and the measured network distance (step S43).

If the configuration change message is not related to the new file server FS (i.e. No at step S41), the CPU 103 updates the configuration table CT based on the received configuration change message without measuring the network distance (step S43). Finally, the CPU 103 sends a configuration change message including the network distance information to all of the file servers FS within the same domain ND (step S44).

(D-4) Configuration Table Update Process in File Server

Figure 11:
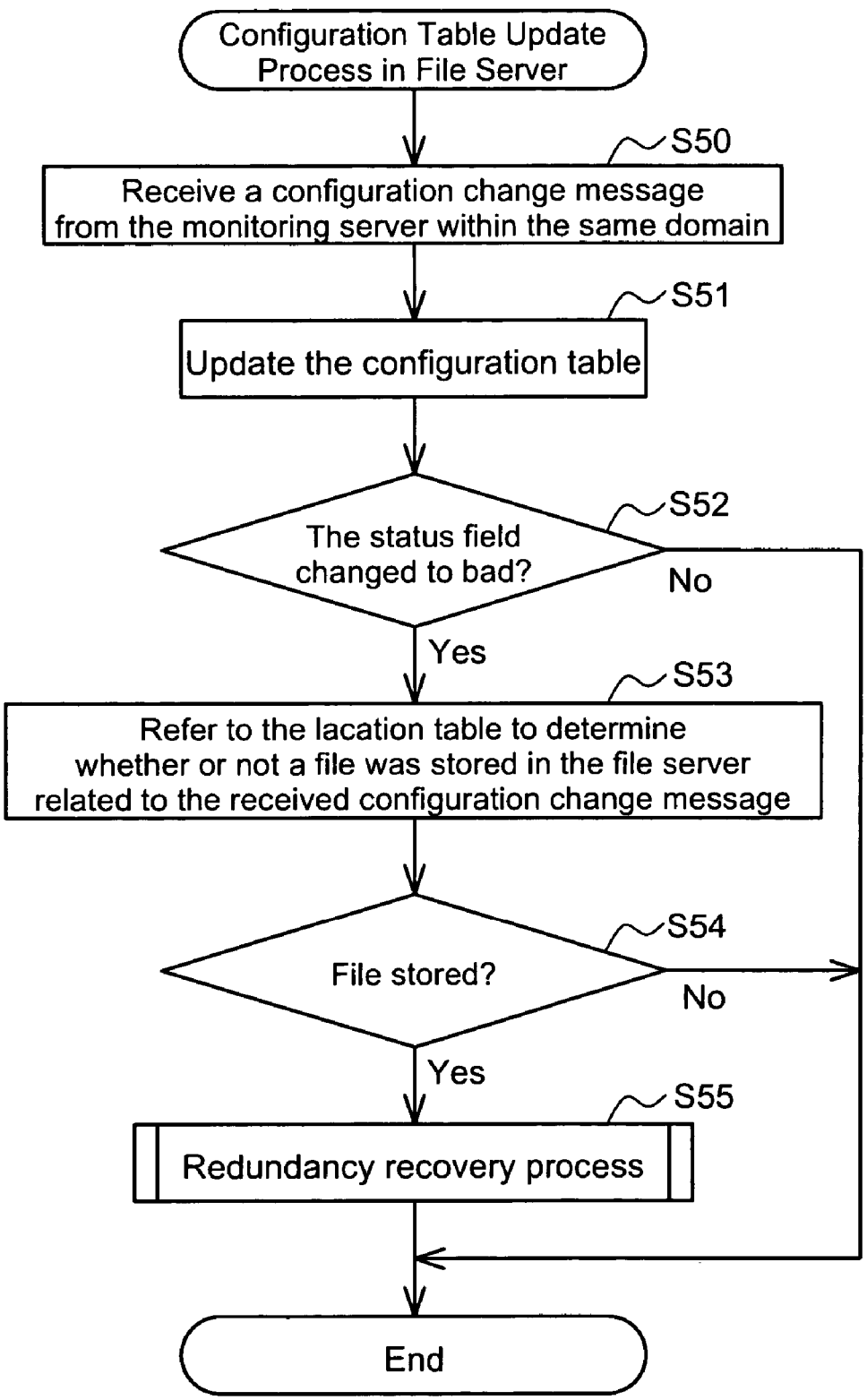
FIG. 11 is a flowchart that shows a configuration table update process performed by the file server.

FIG. 11 is a flowchart that shows a configuration table update process performed by the CPU 203 of the file server FS. The process is performed by the file server FS to update its configuration table CT when it has received a configuration change message from the monitoring server WS.

First, when the CPU 203 receives the configuration change message from the monitoring server WS within the same domain ND (step S50), it updates the configuration table CT retained on the disk device 201 based on the received configuration change message (step S51).

If the update has changed the status field of the configuration table CT from "Good" to "Bad" (i.e. Yes at step S52), the file server FS related to the received configuration change message is determined to be a failed server. Then, the CPU 203 refers to the location table LT to determine whether or not the failed server stored a file (step S53). If it is determined that the failed server stored a file (i.e. Yes at step S54), the CPU 203 determines that the redundancy of the file having stored in the failed server has decreased, and performs a redundancy recovery process described later (step S55). If it is not determined that the failed server stored a file (i.e. No at step S54), the CPU 203 exits this process since the file redundancy does not decreased.

If the status field has not changed through the update of the configuration table CT, or it has changed from "Bad" to "Good" through the update (i.e. No at step S52), the CPU 203 exits this process without performing the redundancy recovery process since the file redundancy has not decreased.

The configuration table update process described above enables the file server FS to detect a decreased redundancy of any file stored in the file storage system 10.

(D-5) Redundancy Recovery Process in File Server

Figure 12:
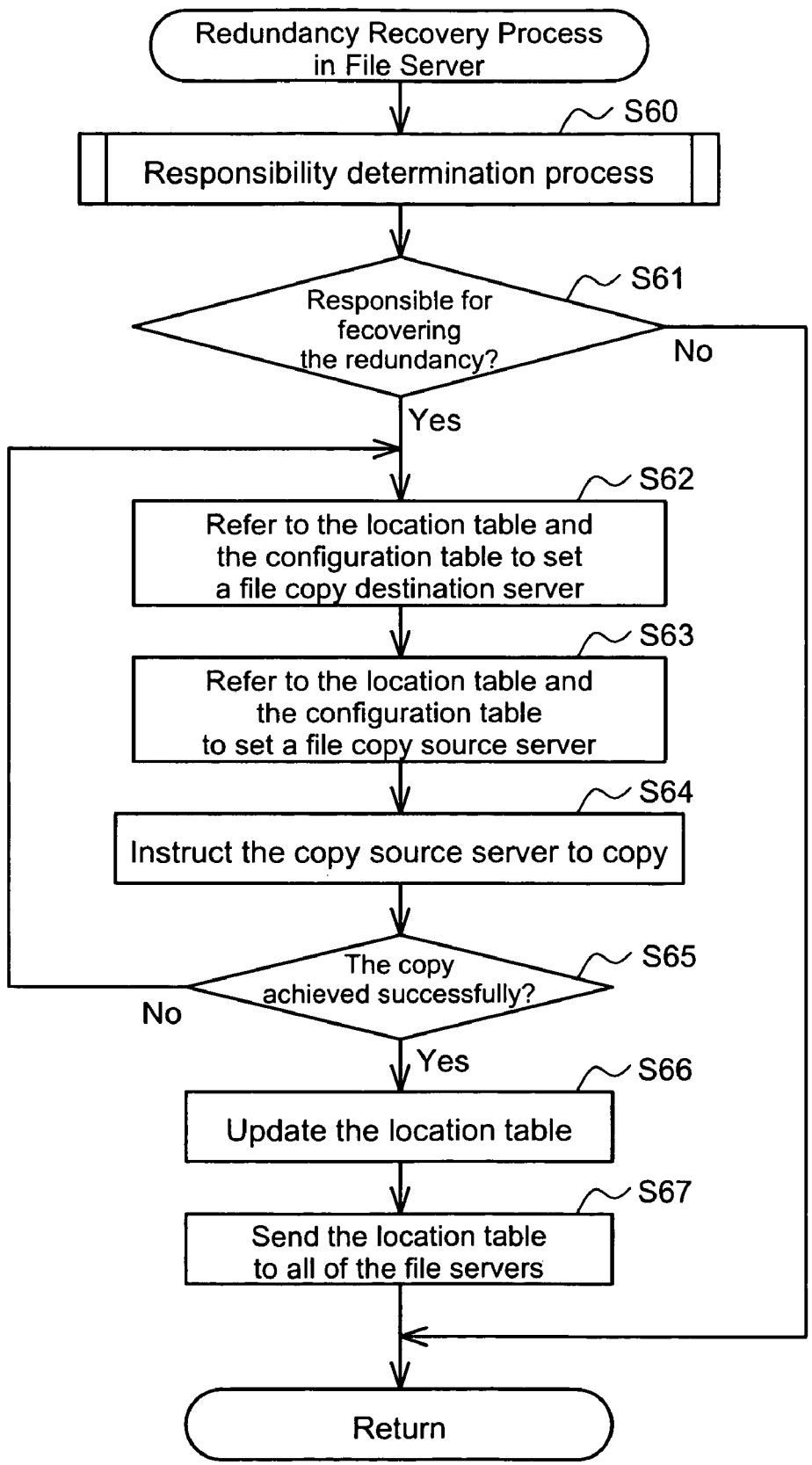
FIG. 12 is a flowchart that shows a redundancy recovery process.

FIG. 12 is a flowchart that shows the above redundancy recovery process. First, the CPU 203 performs a responsibility determination process to determine whether or not the file server FS is responsible for recovering the file redundancy (step S60). This process will be described later. If it is determined through the responsibility determination process that the file server FS is not responsible for recovering the file redundancy (i.e. No at step S61), the CPU 203 exits this process.

If it is determined that the file server FS is responsible for recovering the file redundancy (i.e. Yes at step S61), the CPU 203 refers to the location table LT and the configuration table CT to search a file server FS having the highest remaining disk capacity among the file servers FS that does not store the file identical to one having stored in the failed server, and then set the searched server as a copy destination server for the file (step S62).

Next, the CPU 203 refers to the location table LT and the configuration table CT to search a file server FS that stores the file identical to one having stored in the failed server and has the shortest network distance from the file server FS set as the copy destination server, and set the searched server as a copy source server for the file (step S63). The network distance from the copy destination server to a potential copy source server FS, for example, can be acquired by querying the copy destination server.

Next, the CPU 203 instructs based on the above settings the copy source server to copy the file to the copy destination server (step S64). The copy source server copies the redundancy-decreased file to the copy destination server according to the instruction.

If the copy has been failed (i.e. No at step S65), the CPU 203 returns to step S62 to select another copy destination and another copy source server again. If the copy has been achieved successfully (i.e. Yes at step S65), the CPU 203 updates the location table LT in the disk device 201 (step S66), and then sends the updated location table LT to all of the file servers FS within the file storage system 10 (step S67). The CPU 203 performs the above redundancy recovery process on all of the files having stored in the failed server.

The redundancy recovery process described above enables each file server FS to change the storage destination of the file having stored in the failed server and thus recover the redundancy of the redundancy-decreased file. Therefore, the file storage system 10 can autonomously maintain the file redundancy.

(D-6) Responsibility Determination Process in File Server

Figure 13:
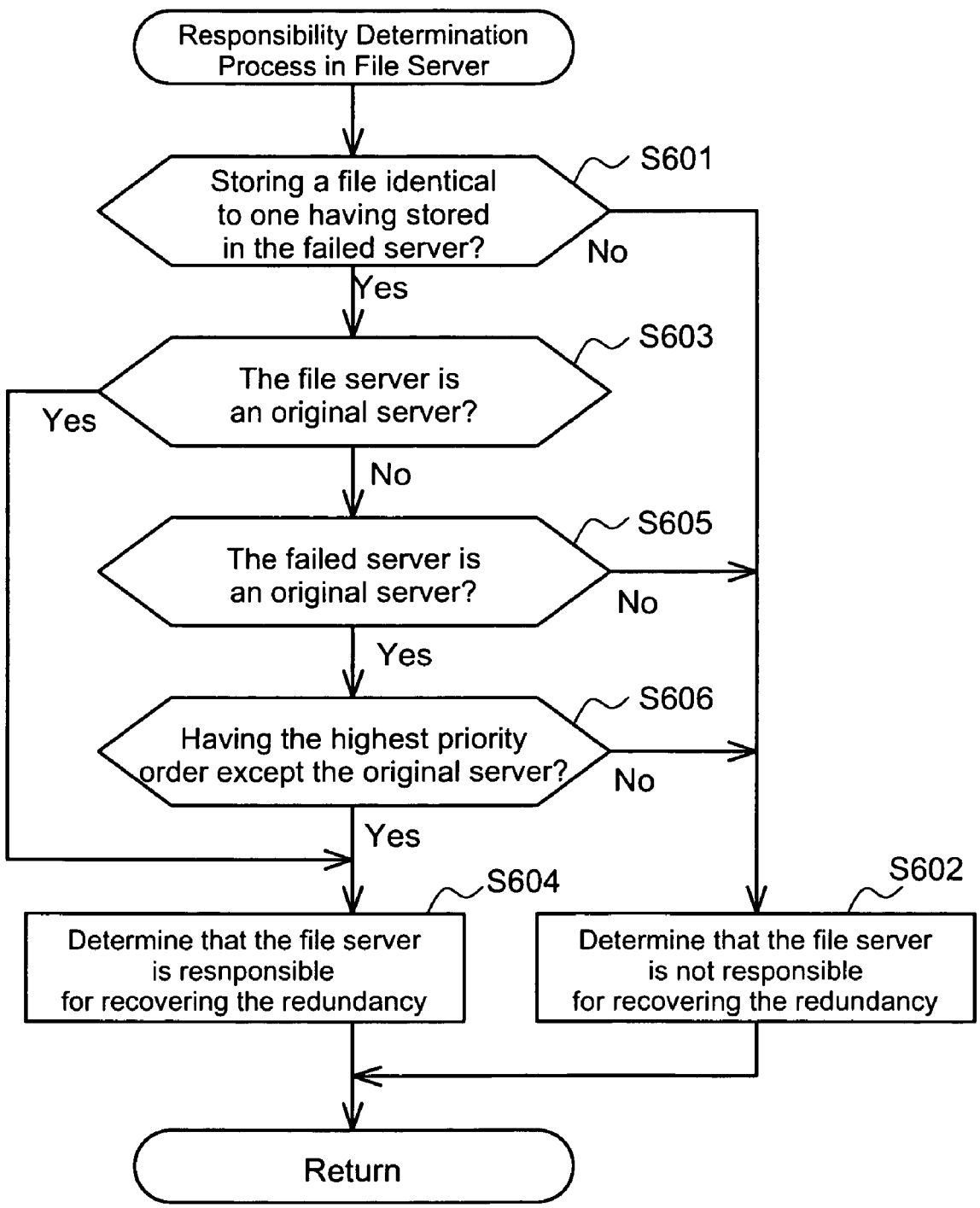
FIG. 13 is a flowchart that shows a responsibility determination process.

FIG. 13 is a flowchart that shows the above responsibility determination process. First, the CPU 203 refers to the location table LT to determine whether or not the file identical to one having stored in the failed server is stored in the file server (step S601). The determination may be performed with reference to the file storage area FA instead of the location table LT.

If the determination shows that the file server FS does not store the identical file (i.e. No at step S601), the CPU 203 determines that the file server FS is not responsible for recovering (step S602). In this case, another file server FS storing the identical file performs the redundancy recovery process.

If the file server stores the identical file (i.e. No at step S601), the CPU 203 refers to the location table LT again to determine whether or not the file server FS is an original server of the file (step S603). If the file server FS is determined to be an original server (step S603), the CPU 203 determines that the file server FS is responsible for recovering (step S604). That is, the original server of the redundancy-decreased file basically performs the redundancy recovery process.

However, when the original server of the redundancy-decreased file is the failed server, another file server FS but the original server has to be responsible for recovering the redundancy. Therefore, the CPU 203 performs the process described below even if the file server FS is not the original server (i.e. No at step S603).

First, the CPU 203 refers to the location table LT to determine whether or not the failed server is the original server of the file whose redundancy is to be recovered (step S605). If it is determined that the failed server is not the original server (i.e. No at step S605), the CPU 203 determines that the file server FS is not responsible for recovering since the original server is responsible for performing the redundancy recovery process (step S602).

If it is determined that the failed server is the original server (i.e. Yes at step S605), the CPU 203 refers to the location table LT to determine whether or not the file server FS has the highest priority except the original server (step S606). The priority order is represented by the order of the "location" recorded in the location table LT. That is, the priority order becomes higher in the order of "location 3," "location 2," and "location1" shown in FIG. 7. Since the location 1 represents the original server, it is determined at step S606 whether or not the file server FS is registered in "location 2."

If the file server FS has the highest priority order except the original server (i.e. Yes at step S606), the CPU 203 determines that the file server FS is responsible for recovering the redundancy (step S604). Otherwise (i.e. No at step S606), the CPU 203 determines that the file server FS is not responsible for recovering the redundancy since another file server having higher priority order performs the redundancy recovery process (step S602).

The responsibility determination process described above enables each file server FS to determine whether or not it is responsible for performing the redundancy recovery process.

(D-7) Disk Balancing Process in Monitoring Server

Figure 14:
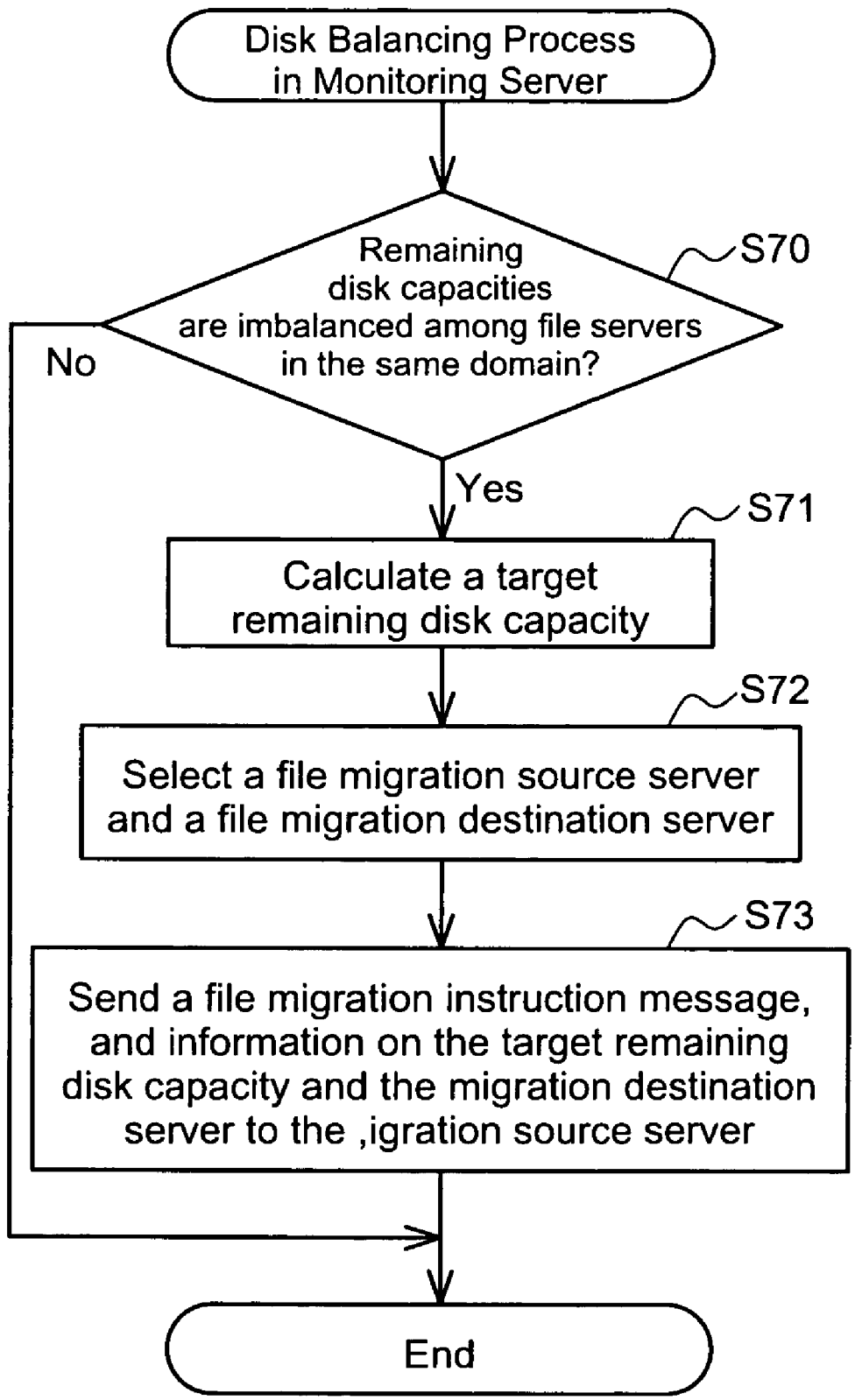
FIG. 14 is a flowchart that shows a disk balancing process.

FIG. 14 is a flowchart that shows a disk balancing process performed by the CPU 103 of each monitoring server WS. The process is performed when the remaining disk capacities have been imbalanced among the file servers FS due to a new file server FS added to the domain or the other reason.

First, the CPU 103 refers to the configuration table CT to determine whether or not the remaining disk capacities are imbalanced among the file servers FS included in the same domain (step S70). This determination may be performed at predetermined intervals or may be triggered by updating the configuration table CT. For example, it may be determined that the remaining disk capacities are imbalanced if the difference in remaining disk capacity among the file servers FS exceeds a predetermined threshold (e.g. 300 Gbytes).

If the CPU 103 has determined that there is no imbalance (i.e. No at step S70), it exits this process. If the CPU 103 has determined that there is an imbalance (i.e. Yes at step S70), it calculates a target remaining disk capacity for the file servers FS (step S71). The target remaining disk capacity, for example, may be equal to an average remaining disk capacity of all of the file servers FS included in the same domain ND.

Next, the CPU 103 refers to the configuration table CT to select a file migration source server and a file migration destination server among the file servers FS included in the same domain ND (step S72). The CPU 103 selects a file server FS with lower remaining disk capacity as the migration source server, and selects a file server FS with higher remaining disk capacity as the migration destination server. Then, the CPU 103 sends a migration instruction message for the file migration, and information on the target remaining disk capacity and the migration destination server to the selected migration source server (step S73).

(D-8) File Migration Process in File Server

Figure 15:
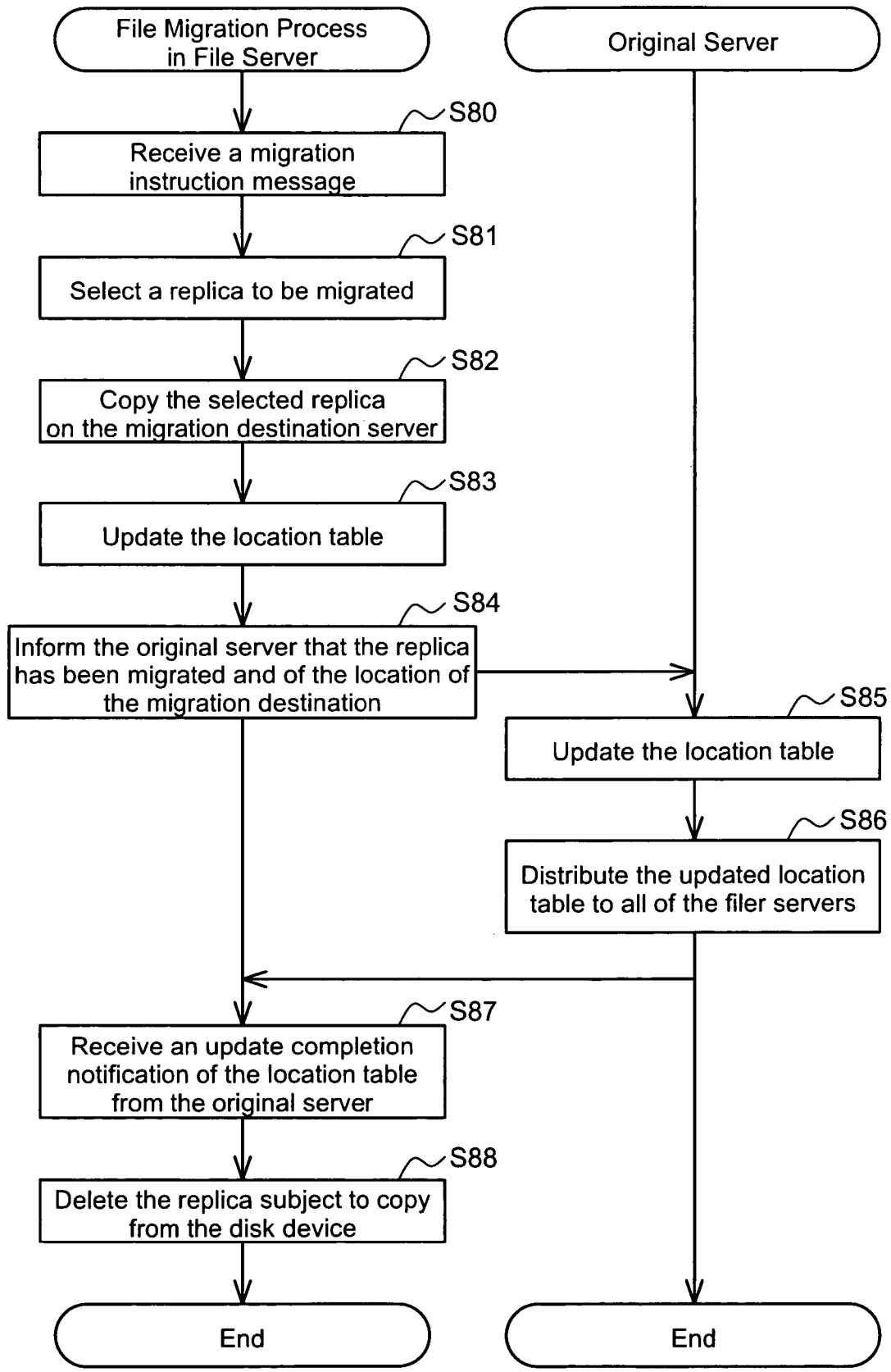
FIG. 15 is a flowchart that shows a file migration process.

FIG. 15 is a flowchart that shows a file migration process performed by the CPU 203 of the file server FS. This process is performed by the file server FS when received the file migration instruction from the monitoring server WS.

First, when the CPU 203 receives the file migration instruction message and the information on the target remaining disk capacity and the migration destination server from the monitoring server WS included in the same domain ND (step S80), it selects a file to be migrated so as to achieve the target remaining disk capacity in consideration of file size and the like (step S81). The file to be migrated is not selected among the original files that were originally created in the file server FS, but selected among the replica files that were created by another file server. Then, the CPU 203 copies the selected replica to the migration destination server (step S82).

Next, the CPU 203 updates the location table LT since the location of the replica has been changed (step S83). Then, the CPU 203 refers to the location table LT to inform the original server of the migrated replica that the replica has been migrated and of the location of the file server FS as the migration destination (step S84).

When the original server receives this information, it updates its location table LT (step S85), and then distributes the updated location table LT to all of the file servers FS included in the file storage system 10 (step S86). When the CPU 203 receives from the original server an update completion notification indicating that the location table LT has been updated (step S87), it clears the replica subject to copy at step S82 from the disk device 201 (step S88).

The file migration process described above enables the remaining disk capacities to be balanced among the file servers FS included in the same domain ND.

Although the above disk balancing process in the monitoring server WS and this process balance the remaining disk capacities among the file servers FS, such processes may be applied to the consumed disk capacities.

E. Modifications

In the above embodiment, each file server FS uses the monitoring server WS included in the same domain to indirectly detect configuration information of another file server FS. However, each file server FS may directly query configuration information of another file server FS without using the monitoring server WS.

In the above embodiment, each file server FS refers to the configuration table CT to detect a failure in another file server FS. However, each file server FS, for example, may issue a "Ping" command to another file server FS and then determine that a failure has occurred in the another file server FS if the another file server FS does not respond.

The embodiment of the present invention has described above. This embodiment enables the file storage system 10 to autonomously maintain the redundancy of file stored in the system without using a centralized controller. Furthermore, the embodiment enables remaining disk capacities to be balanced when an imbalance in remaining disk capacity has been occurred among the file servers FS. The present invention is not limited to such embodiment but may include a variety of aspects without departing from the spirit of the preset invention. For example, the functions implemented as software may be implemented as hardware. Although the above embodiment uses a file as a data unit, the data unit is not limited to a file but may include any other unit.

What is claimed is:

1. A first file server used in a system where identical files are stored according to a predetermined redundancy in a distributed manner into a plurality of file servers connected with each other via a network, said first file server comprising:
   a decreased redundancy detection unit for detecting a decrease in the redundancy of a file stored in said system;
   a determination unit for determining whether or not the first file server has responsibility for recovering the redundancy when said decreased redundancy detection unit has detected a decrease in the redundancy; and
   a redundancy recovery processing unit for selecting, based on a predetermined condition, a second file server that does not store an identical file identical to said file having the decrease in redundancy, setting said selected second file server as a copy destination server, setting a third file server that does store the identical file as a copy source server, and copying the identical file from said copy source server to said copy destination server when said determination unit has determined the responsibility of the first file server,
   wherein said decreased redundancy detection unit detects a decrease in redundancy of the file based on information contained in a configuration table, and
   wherein said configuration table stores in corresponding relation information regarding a state of each file server used in the system including information of a location of each file server and status of each file server.

2. A first file server according to claim 1, wherein
said determination unit determines the responsibility of the first file server in the case where said file having the decrease in redundancy was originally created on the first file server.

3. A first file server according to claim 1, wherein
said determination unit determines no responsibility of the first file server in the case where the first file server does not store a file identical to said file having the decrease in redundancy.

4. A first file server according to claim 1, wherein
a priority order is set for each of the plurality of file servers within said system, and
said determination unit determines the responsibility of the first file server in the case where the first file server has the highest priority order.

5. A first file server according to claim 1, wherein
a priority order is set for each of the plurality of file servers within said system, and
said determination unit determines the responsibility of the first file server in the case where the first file server stores the identical file and has the highest priority order among the plurality of file servers storing the identical file.

6. A first file server according to claim 1, wherein
said decreased redundancy detection unit considers the redundancy of a file to have decreased in the case where said decreased redundancy detection unit detects a failure having occurred in another file server.

7. A first file server according to claim 6, further comprising:
   a location storage unit for storing a relationship between each file stored in said system and each of the plurality of file servers storing said each file,
   wherein said determination unit searches said location storage unit and then determines the responsibility of the first file server in the case where it has been determined that the first file server stores the identical file.

8. A first file server according to claim 7, wherein
said location storage unit records a priority order set for each of the plurality of file servers storing an identical file, and
said determination unit searches said location storage unit and then determines the responsibility of the first file server in the case where it has been determined that the first file server stores the identical file and has the highest priority order among the plurality of file servers storing the identical file.

9. A first file server according to claim 6, further comprising:
   a location storage unit for storing a relationship between each file stored in said system and each of the plurality of file servers storing said each file,
   wherein said redundancy recovery processing unit searches said location storage unit for one of the plurality of file servers storing the identical file and then sets one of the searched file servers as said copy source server.

10. A first file server according to claim 1, further comprising:
    a usage status detection unit for detecting a usage status of a storage device provided for another file server,
    wherein said redundancy recovery processing unit sets one of the plurality of file servers having the highest remaining capacity of said storage device or one of the plurality of file servers having the lowest consumed capacity of said storage device as said copy destination server.

11. A first file server according to claim 1, further comprising:
    a domain detection unit for detecting a network domain to which another file server belongs,
    wherein said redundancy recovery processing unit selects said copy source server and said copy destination server such that a network domain to which said copy source server belongs is different from a network domain to which said copy destination server belongs.

12. A first file server according to claim 1, wherein
said redundancy recovery processing unit sets one of the plurality of file servers storing the identical file and having the shortest network distance from said copy destination server as said copy source server.

13. A file server controller for balancing usage statuses among storage devices, said file server controller being used in a system where files are stored in a distributed manner into a plurality of file servers connected with each other via a network, said storage devices being provided for said respective file servers, said file server controller comprising:
- a usage status detection unit for detecting usage statuses of storage devices provided for said respective file servers; and
- a file migration control unit for selecting a file migration source server and a file migration destination server according to usage statuses of storage devices provided for said respective file servers and then migrating a file from said file migration source server to said file migration destination server,
- wherein said usage status detection unit detects a usage status of the storage devices based on information contained in a configuration table, and
- wherein said configuration table stores in corresponding relation information regarding a state of each storage device used by the file servers including information of a storage capacity of the storage device and a location of the file server using the storage device.

14. A file server controller according to claim 13, further comprising:
- a target value determination unit for calculating a target value of usage statuses of storage devices provided for the respective file servers according to usage statuses of storage devices provided for the respective file servers detected by said usage status detection unit,
- wherein said file migration control unit migrates a file so that a usage status of a storage device provided for said file migration source server becomes equal to said target value.

15. A method of recovering redundancy of a file by means of a first file server used in a system where identical files are stored according to a predetermined redundancy in a distributed manner into a plurality of file servers connected with each other via a network, said method comprising steps of:
- detecting a decrease in the redundancy of the file stored in said system;
- determining whether or not the first file server has responsibility for recovering redundancy when a decrease in redundancy of the file has been detected;
- selecting a second file server that does not store an identical file identical to said file having the decrease in redundancy, based on a predetermined condition;
- setting said selected second file server as a copy destination server;
- setting a third file server that stores the identical file as a copy source server; and
- copying the identical file from said copy source server to said copy destination server when the responsibility of the first file server has been determined,
- wherein said step of detecting a decrease in redundancy detects a decrease in redundancy of the file based on information contained in a configuration table, and
- wherein said configuration table stores in corresponding relation information regarding a state of each file server used in the system including information of a location of each file server and status of each file server.

16. A method of balancing usage statuses among storage devices by means of a file server controller, said file server controller being used in a system where files are stored in a distributed manner into a plurality of file servers connected with each other via a network, said storage devices being provided for said respective file servers, said method comprising steps of:
- detecting usage statuses of storage devices provided for said respective file servers; and
- selecting a file server as a file migration source and a file server as a file migration destination according to usage statuses of storage devices provided for said respective file servers and then migrating a file from said file migration source server to said file migration destination server based on the selection,
- wherein said step of detecting usage statuses of the storage devices detects a usage status of the storage devices based on information contained in a configuration table, and
- wherein said configuration table stores in corresponding relation information regarding a state of each storage device used by said file servers including information of a storage capacity of the storage device and a location of the file server using the storage device.

17. A computer readable recording medium in which a computer program is recorded, the computer program recovering redundancy of a file by means of a first file server used in a system where identical files are stored according to a predetermined redundancy in a distributed manner into a plurality of file servers connected with each other via a network, said computer program causing said first file server to implement steps of:
- detecting a decrease in redundancy of the file stored in said system;
- determining whether or not the first file server has responsibility for recovering redundancy when a decrease in the redundancy of the file has been detected;
- selecting a second file server, that does not store an identical file identical to said file having the decrease in redundancy, based on a predetermined condition;
- setting said selected second file server as a copy destination server;
- setting a third file server that does store the identical file as a copy source server; and
- copying the identical file from said copy source server to said copy destination server when the responsibility of the first file server has been determined,
- wherein said step of detecting a decrease in redundancy detects a decrease in redundancy of the file based on information contained in a configuration table, and
- wherein said configuration table stores in corresponding relation information regarding a state of each file server used in the system including information of a location of each file server and status of each file server.

18. A computer readable recording medium in which a computer program is recorded, the computer program for balancing usage statuses among storage devices by means of a file server controller, said file server controller being used in a system where files are stored in a distributed manner into a plurality of file servers connected with each other via a network, said storage devices being provided for said respective file servers, said computer program causing a computer to implement steps of:
- detecting usage statuses of storage devices provided for said respective file servers; and
- selecting a file server as a file migration source and a file server as a file migration destination according to usage statuses of storage devices provided for said respective file servers and then migrating a file from said file migration source server to said file migration destination server based on the selection,
- wherein said step of detecting usage statuses of the storage devices detects a usage status of the storage devices based on information contained in a configuration table, and wherein said configuration table stores in corresponding relation information regarding a state of each storage device used by said file servers including information of a storage capacity of the storage device and 1 of the file server using the storage device.

19. A first server used in a system where identical data are stored according to a predetermined redundancy in a distributed manner into a plurality of servers connected with each other via a network, said first server comprising:

- a decreased redundancy detection unit for detecting a decrease in redundancy of data stored in said system;
- a determination unit for determining whether or not the first server has responsibility for recovering redundancy when said decreased redundancy detection unit has detected a decrease in redundancy of data;
- a redundancy recovery processing unit for selecting a second server that does not store identical data based on a predetermined condition, setting said selected second server as a copy destination server, setting a third server that does store the identical data as a copy source server, and copying the identical data from said copy source server to said copy destination server when said determination unit has determined the responsibility of the first server, wherein said decreased redundancy detection unit detects a decrease in redundancy of the file based on information contained in a configuration table, and wherein said configuration table stores in corresponding relation information regarding a state of each file server used in the system including information of a location of each file server and status of each file server.

* * * * *